United States Patent [19]
Hurtevent

[11] Patent Number: 5,117,944
[45] Date of Patent: Jun. 2, 1992

[54] ELECTRICAL INDUSTRIAL TRUCK

[75] Inventor: Jacques Hurtevent, Chatellerault, France

[73] Assignee: Linde Aktiengesellschaft, Fed. Rep. of Germany

[21] Appl. No.: 672,347

[22] Filed: Mar. 20, 1991

[30] Foreign Application Priority Data

Mar. 22, 1990 [FR] France ............... 90 03665

[51] Int. Cl.⁵ ............................................. B66B 9/20
[52] U.S. Cl. .................................. 187/9 R; 280/32.7; 280/43.12
[58] Field of Search .................. 187/1 R, 9 E, 9 R; 280/43.12, 32.5, 32.7; 180/273

[56] References Cited

U.S. PATENT DOCUMENTS

| 3,394,770 | 7/1968 | Goodacre | 187/9 R |
|---|---|---|---|
| 3,485,314 | 12/1969 | Herr | 280/32.7 |
| 4,065,012 | 12/1977 | Rocco | 280/43.12 |
| 4,878,339 | 11/1989 | Marier et al. | 280/32.7 |

Primary Examiner—Robert P. Olszewski
Assistant Examiner—Kenneth Noland
Attorney, Agent, or Firm—Webb, Burden, Ziesenheim & Webb

[57] ABSTRACT

An electric industrial truck which can be operated in either a walking mode or a riding mode. The truck has an electric drive motor and a draw-bar with controls thereon. A platform is pivotally attached to the truck for movement between a vertical position and a horizontal position. The truck includes a locking device to lock the platform in the horizontal operating position to prevent accidental movement of the platform during operation of the truck.

8 Claims, 5 Drawing Sheets

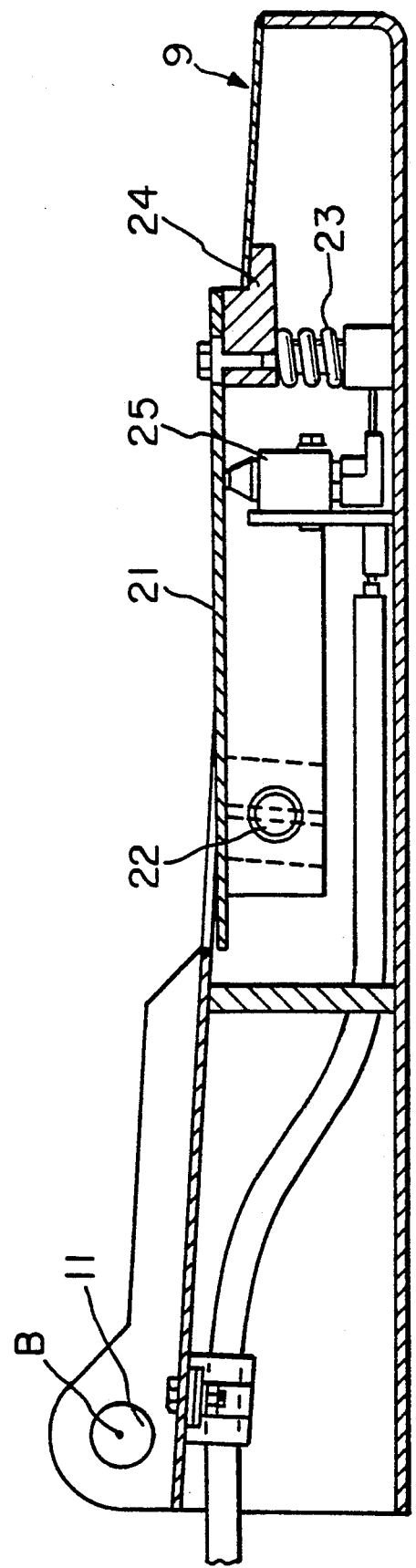

ELECTRICAL INDUSTRIAL TRUCK

BACKGROUND OF THE INVENTION

1. Field of the Invention

The invention relates to electric industrial trucks which may be operated in either a walking mode or in a riding mode. More particularly, the invention is directed to electric industrial trucks having a platform for the operator which may be pivoted into a vertical position when the truck operator is walking or into a horizontal position when the operator is riding on the truck.

2. Description of Related Art

Electric industrial trucks are well known in the art. This type of truck combines the advantages of maneuverability and space-saving construction of trucks which are controlled by an operator on foot, with the advantage of high speed over relatively long distances when the operator rides on the truck.

It is known that irregular jerky movements of the truck occur due to uneven surfaces or obstacles in the travel path of the truck, and these movements of the truck can cause movement of the platform especially at higher speeds. Because the operator platform is pivotally supported on the truck, the jerky movements can lead to erratic movement of the platform in the vertical plane which can result in unintentional manipulations of the truck control element on the draw-bar and cause dangerous operating conditions. Another problem with the pivotally mounted operator platform is that during movement of the truck through large depressions in the travel path or onto a ramp, especially when traveling in the direction opposite the forks, the free end of the operator platform may be accidentally pivoted upwardly, resulting in injury to the operator's legs.

Known electric trucks generally have a foot-operated dead man's switch on the operator platform. Unless this switch is maintained in the closed position, the current supply from the batteries to the drive motor of the truck is interrupted and an electrically releasable spring-loaded brake may be actuated to stop the movement of the truck. The truck can be set in motion again only when the operator closes the dead man's switch. If the operator should fall or jump off the platform during travel, the truck will automatically stop.

SUMMARY OF THE INVENTION

The electric truck of the invention includes a platform pivotally mounted on the draw-bar end of the truck opposite the lifting forks. The platform extends across the end of the truck and can be pivoted upwardly into a vertical or rest position generally parallel with the front wall of the truck when the truck is operated in the walking mode. The platform is pivoted downwardly from the vertical position to the horizontal operating position when the truck is operated in the riding mode.

When the truck is operated in the riding mode with the operator standing on the platform, the truck can move at a considerably higher speed than when the operator is operating the truck in the walking mode. This is especially advantageous when the goods to be moved must be transported over a relatively long distance.

The present invention avoids the shortcomings of the prior art and provides an improved industrial electric truck with increased operating safety and simplified construction. These results are achieved according to the invention by providing the operator platform with a locking mechanism that is actuated by the operator and prevents undesirable movement of the platform when it is in the horizontal operating position. In this manner, movements of the platform out of the horizontal operating position are impossible and the operating reliability of the truck is substantially improved. The reaction of the vehicle to jerky vertical movements caused by unevenness in the travel path is also nullified.

In practice, when the platform is locked in the horizontal operating position, it is so stable that it can support the weight of the truck, the load on the forks, and the operator, if the free end of the operator platform contacts the travel path or a ramp.

Another refinement of the instant invention is that the dead man's switch and the platform locking mechanism have a single common actuating element. Thus, additional advantages result with regard to the ease of operation and the increase in reliability since only a single actuating element locks the platform in the horizontal operating position and closes the dead man's switch to permit the truck to move. Locking the platform in the horizontal operating position is particularly important for a truck having a dead man's switch since if no locking mechanism is present and the platform moves out of the operating position due, for example, to jerky vertical movement, the operator's foot can slide off the dead man's switch and the vehicle will stop abruptly. Abrupt stops cause the load on the forks to be spilled. This situation is prevented by locking the platform in the horizontal operating position.

In order to assure that the single common actuating element for both the dead man's switch and the platform locking device retains its position in the case of weight shifts and position changes of the operator on the platform, the actuating element is a pedal having a large enough area to simultaneously accommodate both feet of the operator. The large surface of the pedal assures that the operator locks the platform in place when he climbs onto it and closes the dead man's switch into the operating position.

The platform locking mechanism can be mechanical. For example, when the pedal is actuated, a rod coupled to it and to a detent pawl moves the pawl to lock the platform in the horizontal operating position. However, it is advantageous to connect the pedal with an electric control switch that has a position to interrupt the electric current supply to at least one electromagnet when the platform is in the operating position, so that the electromagnet actuates a slidable position-securing bolt that locks the platform in the horizontal operating position. Such an arrangement is inexpensive since the truck already has batteries to provide a current source. The position-securing bolt can be spring-loaded and as soon as the electromagnet is acted upon by electric current the bolt is pressed against the spring force into a position to lock the platform in the horizontal operating position.

Known industrial trucks have spaced safety rails parallel to the longitudinal axis of the truck on opposite sides of the platform to prevent the operator from falling off the platform. These safety rails are located on the front of the truck when not in use and are moved to the sides of the platform when in the operating position. According to the invention, each safety rail is pivotable about a vertical axis located on the front of the truck to move the rail from the resting position across the truck into the operating position parallel to the longitudinal axis of the truck.

In order to prevent the truck from being operated in the riding mode when the safety rails are not in the operating position or being operated in the walking mode with the safety rails swung out, the safety rails are operatively connected with position-holding end switches that have a position that interrupts the electric current supply to the drive motor and can also activate the electric spring-loaded brakes to prevent operation of the truck. Each end switch is open when the platform and the two safety rails are in the riding position and is closed when the platform and the safety rails are in the walking position.

The features which characterize the invention are pointed out with particularity in the claims annexed to and forming a part of this application. For a better understanding of the invention, its operating advantages and the specific objects attained by its use, reference should be had to the accompanying drawings and descriptive matter in which a preferred embodiment of the invention is illustrated and described. Like reference characters describe like parts throughout the drawings.

BRIEF DESCRIPTION OF THE DRAWINGS

FIG. 6 is a section on line VI—VI of FIG. 5.

DESCRIPTION OF THE PREFERRED EMBODIMENT

Figure 1:
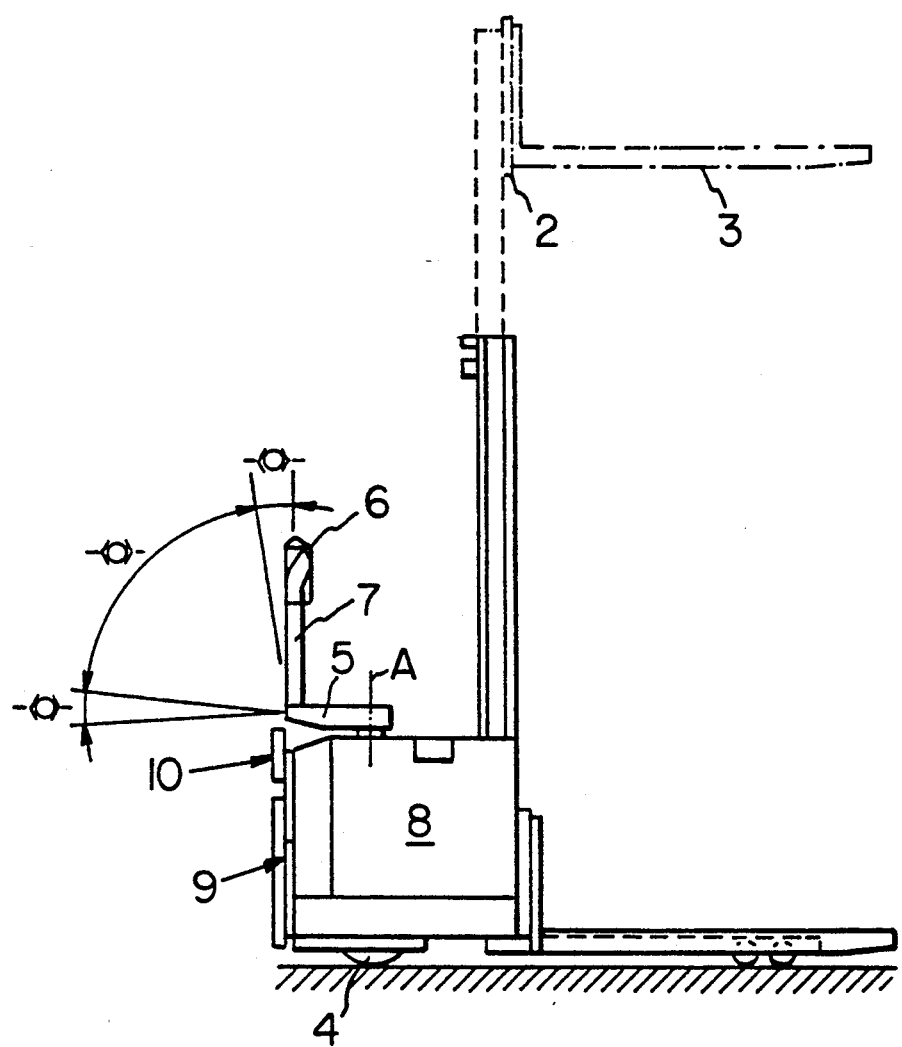
FIG. 1 is a schematic elevation of a truck according to the invention in the walking mode of operation.

FIG. 1 of the drawings shows an electric truck with a load carrier 2 vertically movable along a lifting stand 1 located at one end of the truck. Two spaced load-supporting forks 3 are supported on load carrier 2. A steering and drive wheel 4 is pivotally attached to a draw-bar 5 which is pivoted about a vertical axis A. A rod 7 having a draw-bar head 6 on its upper end carrying the operating controls for the truck is pivotally attached to draw-bar 5. The rod 7 is urged into a vertical position by a retraction spring (not shown) when the truck is stopped and the current supply to the electric drive motor is interrupted by a suitable switching arrangement and electrically releasable spring-loaded brakes of the truck are applied. When the truck is to be moved, draw-bar head 6 and rod 7 are pivoted out of the vertical position to release the spring-loaded brakes and to supply current to the electric drive motor. If the retraction spring for rod 7 fails, the rod falls into a horizontal position, the current supply to the electric drive motor is interrupted and the spring-loaded brakes are applied. When head 6 is located between the vertical and horizontal positions, the brake is released and current is supplied to the electric drive motor to operate the truck.

The truck includes a battery box 8 in which standard batteries for the drive motor are located. The platform 9 is mounted on the front of the truck, i.e., on the draw-bar end of the truck, adjacent to the front of battery box 8. Two safety rails 10 are also pivotally mounted adjacent to the front of battery box 8. The safety rails are shown in FIG. 1 in the folded-in position, parallel to the front of battery box 8 and in FIG. 2 in the extended position. The position of safety rails 10 and platform 9 shown in FIG. 1 is for the truck in the walking mode of operation, in which the operator moves freely relative to the truck.

Figure 2:
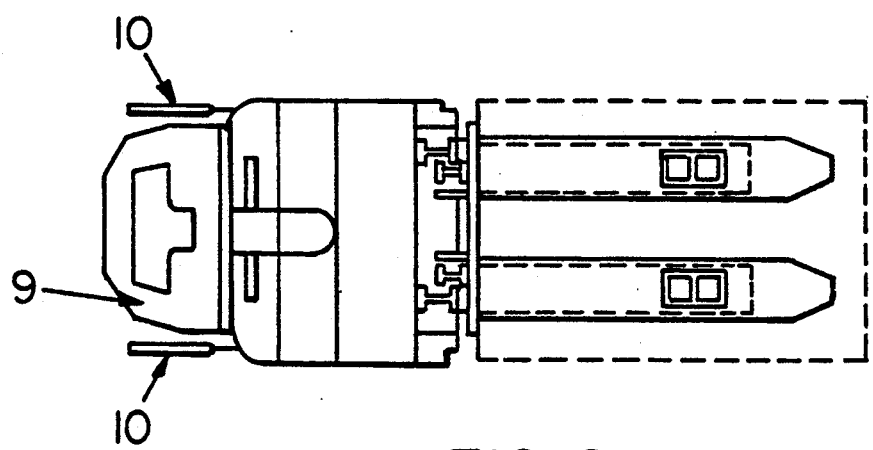
FIG. 2 is a schematic plan view of a truck according to the invention in the riding mode of operation.

FIG. 2 of the drawings shows the truck in the riding mode of operation with platform 9 in the horizontal operating position and safety rails 10 extended along the opposite sides of the platform. In the operating position, the operator rides on the platform, which is advantageous in transporting loads over relatively long distances because the truck speed can be increased above the speed in the walking mode of operation.

Figure 3:
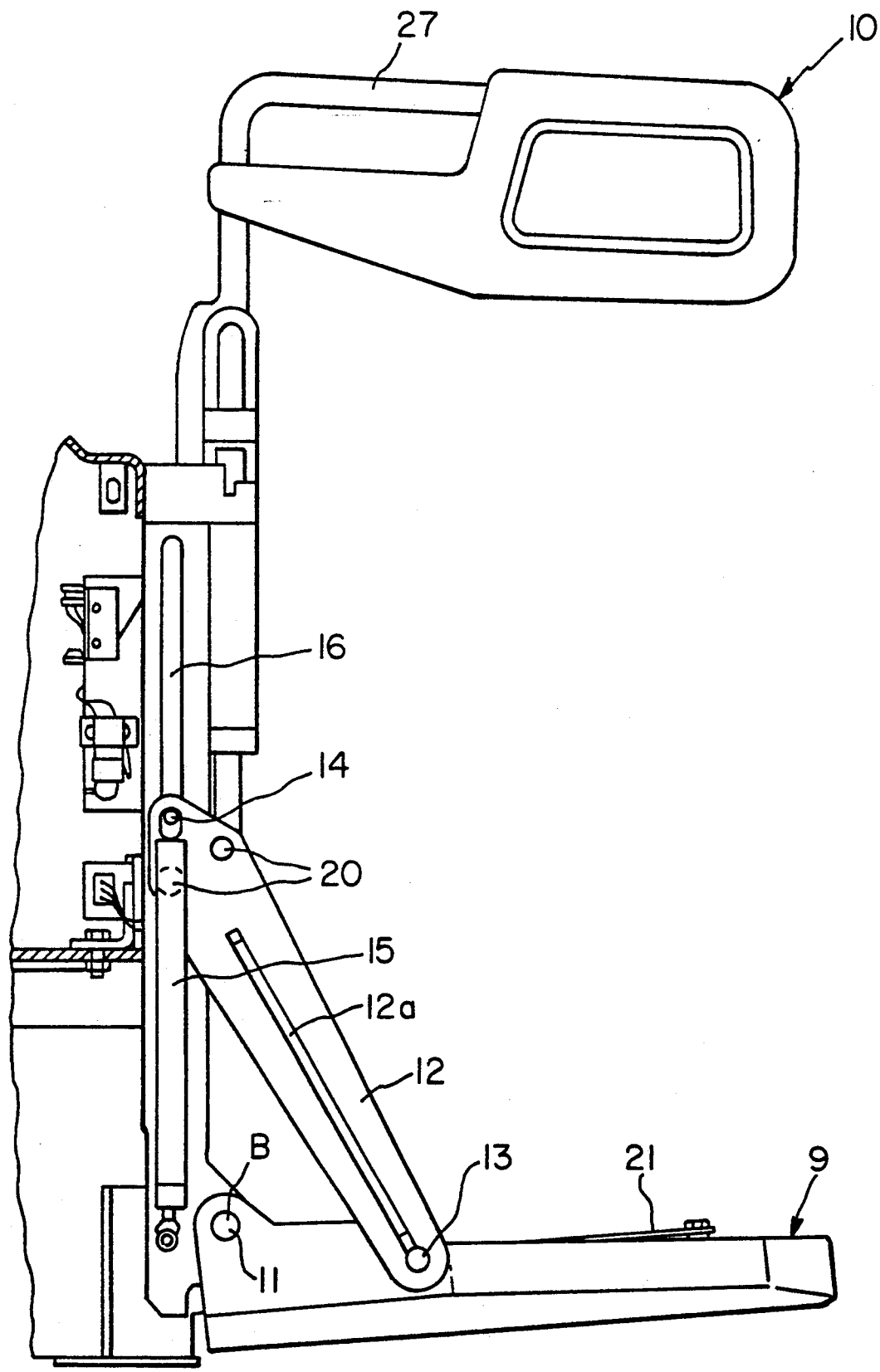
FIG. 3 is a partial side view of the platform in the horizontal position.

FIG. 3 of the drawings shows platform 9 pivoted into the horizontal position on axis B which is located on the draw-bar end of the truck. The platform is pivoted from an approximately vertical rest position into an approximately horizontal operating position. The platform 9 is pivoted about bolts 11 which are located on the axis B. One end of a rocking lever 12 having an elongated strengthening rib 12a is connected to each outer edge of platform 9 by a bolt 13 which is spaced from the pivot bolt 11 on that edge of the platform. The other end of each rocking lever 12 is fastened by a bolt 14 to the upper end of a gas spring 15 which acts in the vertical direction and each bolt 14 is guided in a vertical groove 16 formed in a member mounted on the truck. The lower end of each gas spring 15 is fastened to the truck. Each gas spring 15 exerts an upward force directed toward the vertical position of platform 9 by means of the connection with a rocking lever 12. When platform 9 is in the vertical position, gas springs 15 are relaxed to a certain pretension. However, the spring force at the pretension position of gas springs 15 is sufficient to hold the platform 9 securely in the vertical position.

Figure 4:
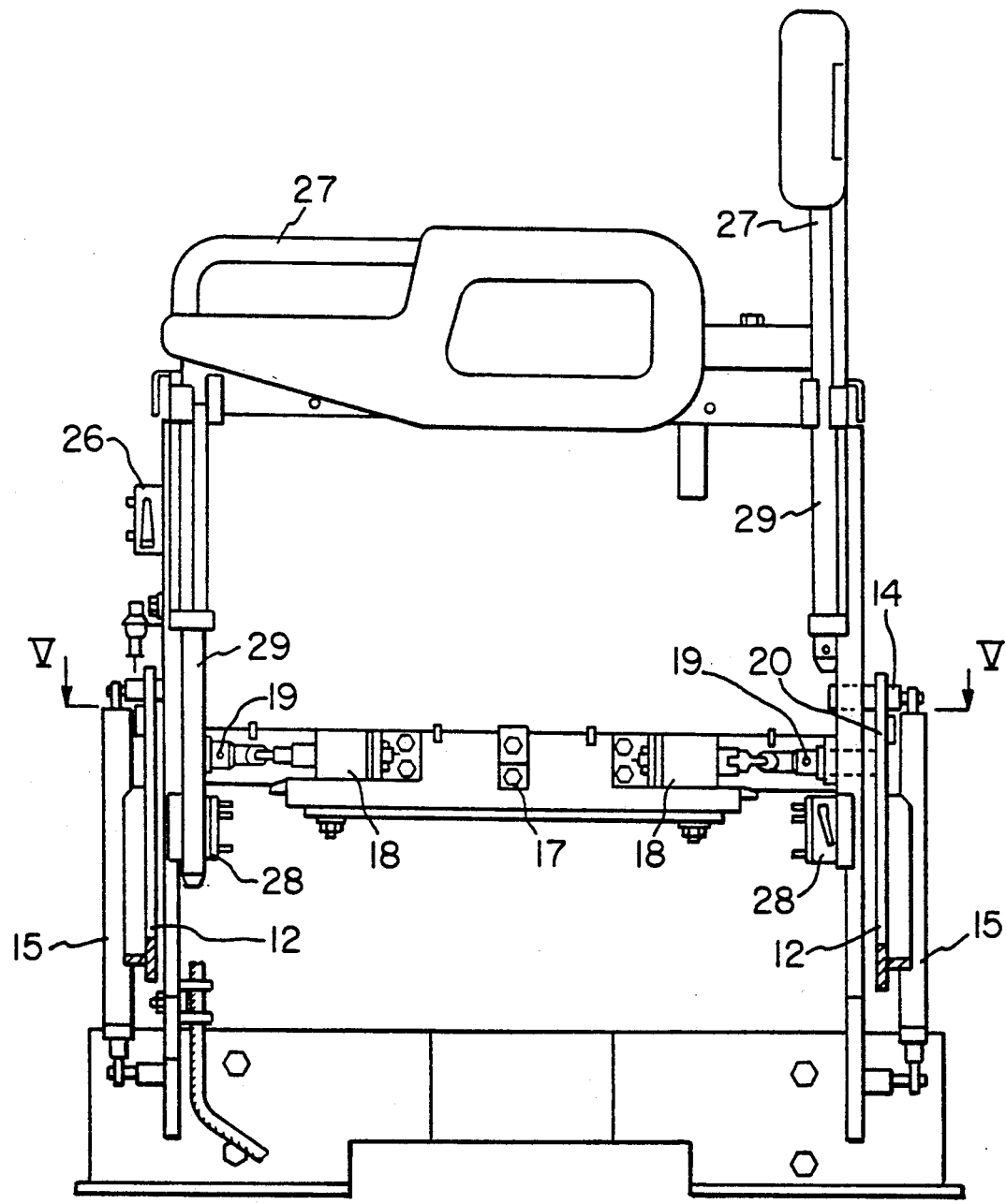
FIG. 4 is a partial front view of the vehicle with the platform removed.

The platform 9 can be locked in the horizontal operating position by the locking mechanisms shown in FIG. 4 of the drawings. There is a locking mechanism on each side of the platform and each locking mechanism consists of a horizontally mounted electromagnet 18 that actuates a horizontally mounted securing bolt 19. Each bolt 19 is longitudinally movable so that the end of the bolt can engage within a hole 20 in a rocking lever 12 when the bolt is moved outwardly into the extended position by the associated electromagnet so that the associated rocking lever 12 cannot pivot about bolts 11 and platform 9 is locked in the horizontal operating position. Two holes 20 which are symmetrical with the axis of rocking lever 12 are provided in each rocking lever. Actuation of the locking devices will be understood with specific reference to FIGS. 5 and 6 of the drawings.

Figure 5:
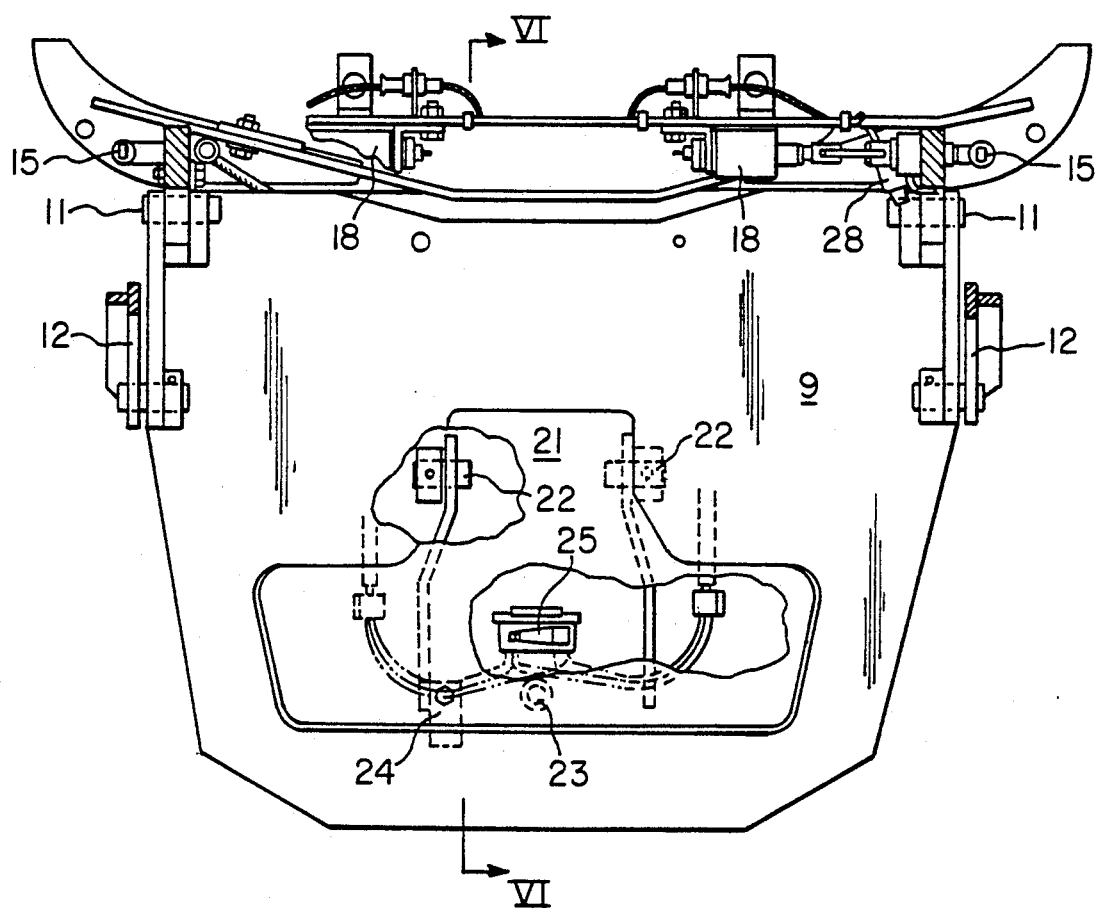
FIG. 5 is a section on line V—V of FIG. 4 with the platform in the horizontal position.

As shown in FIGS. 5 and 6 of the drawings, platform 9 is provided with a pedal 21 having a surface sufficiently large to simultaneously receive both feet of an operator when the truck is operating in the riding mode. The pedal 21 is approximately co-planar with the upper surface of platform 9 and constitutes a part of the upper surface of the platform. One end of pedal 21 is supported by bolts 22 and the pedal is loaded at some distance from bolts 22 by a pressure spring 23. In the static condition, the end of pedal 21 supported by pressure spring 23 is slightly raised out of the plane of the platform. The stroke of pedal 21 is limited and the force of pressure spring 23 on the pedal is determined by a stop 24.

When pedal 21 is stepped on by the operator, it moves downwardly and a control switch 25 is closed to activate electromagnets 18 so that the position-securing bolts 19 slide outwardly and the end of each bolt engages a hole 20 in a rocking lever 12 to lock the platform in the horizontal operating position. The control switch 25 also serves as a dead man's switch to interrupt the current supply to the electric drive motor of the truck when pedal 21 is not depressed. If desired, a separate dead man's switch may be provided.

Because pedal 21 cannot be operated by the operator when platform 9 is in the vertical position, there must be an alternate way to supply current to the electric drive motor of the truck and to release the electric spring-loaded brakes. This can be accomplished, for example, by one or more stop lugs that press on pedal 21 when platform 9 is in the vertical position to actuate control switch 25. It is also possible, as shown in FIG. 4 of the drawings, to provide a switch 26 which is closed by one of the raised rocking levers 12 so that the control switch 25 is bypassed and platform 9 is maintained in the vertical position.

As is evident from FIGS. 2 and 4 of the drawings, a safety rail 10 is provided on each side of platform 9. Each safety rail is pivotable around the axis of its vertical leg and functions as a restraining member when in place. In the vertical position of platform 9, safety rails 10 are perpendicular to the longitudinal axis of the truck. An appropriate switch 28 is provided for each safety rail 10 for holding the rail in this position. Each switch 28 is actuated by a guide rod 29 which receives a part of the vertical leg of a safety rail 10. To move a safety rail 10 into the operating position, the safety rail is raised so that its guide rod 29 is disengaged from its complementary switch 28. The safety rail is then rotated approximately 90. and lowered slightly, to fix the safety rail 10 in the operating position shown in FIG. 2 with the horizontal leg 27 parallel to the sides of platform 9.

If none or only one of the safety rails is in the operating position when platform 9 is in the horizontal operating position, the switches 28 and the switches 26 are opened so that the current to the vehicle motor is interrupted and possibly the electric spring-loaded brakes are applied even though control switch 25 is actuated. The current to the motor is also interrupted if both safety rails are swung out, when platform 9 is in the vertical position. The truck can thus be set in motion only if safety rails 10 and platform 9 are in the prescribed positions for either walking or riding.

The foregoing describes a preferred embodiment of the invention and is given by way of example only. The invention is not limited to any of the specific features described herein, but includes all such variations thereof within the scope of the appended claims.

I claim:

1. An electric industrial truck adapted to be operated in either a walking mode or a riding mode, said truck having an electric drive motor, one end of said truck having a draw-bar and a platform pivotally attached to the end of said truck having said draw-bar for movement between a vertical rest position and a horizontal operating position, said truck having locking means for locking said platform in the horizontal operating position to prevent pivotal movement of said platform from the horizontal operating position during operation of said truck, a foot-actuated dead man's switch on said platform and a single actuating means for said dead man's switch and said locking means.

2. A truck as set forth in claim 1, wherein said single actuating means is a foot pedal, said foot pedal having a size to simultaneously accommodate both feet of an operator of said truck.

3. A truck as set forth in claim 2, wherein said locking means includes at least one eletcromagnet, a control switch electrically connected to said at least one electromagnet and adapted to interrupt the passage of electric current to said at least one electromagnet, said single actuating means being operatively connected with said control switch to interrupt the passage of electric current to said at least one electromagnet when said platform is in the horizontal operating position, and a slidable position-securing bolt connected with said at least one electromagnet adapted to lock said platform in the horizontal operating position.

4. A truck as set forth in claim 1, wherein said locking means includes at least one electromagnet, a control switch electrically connected to said at least one electromagnet and adapted to interrupt the passage of electric current to said at least one electromagnet, said single actuating means being operatively connected with said control switch to interrupt the passage of electric current to said at least one electromagnet when said platform is in the horizontal operating position, and a slidable position-securing bolt connected with said at least one electromagnet adapted to lock said platform in the horizontal operating position.

5. A truck as set forth in claim 4, having a safety rail pivotally mounted on each side of said platform adapted to be located in an operating position parallel to the longitudinal axis of said truck when said platform is in the horizontal operating position, means for pivoting each of said safety rails about a vertical axis located at said front end of said truck to move each of said safety rails from a rest position perpendicular to the longitudinal axis of said truck into the operating position and means for holding each of said safety rails in said operating position.

6. A truck as set forth in claim 3, having a safety rail pivotally mounted on each side of said platform adapted to be located in an operating position parallel to the longitudinal axis of said truck when said platform is in the horizontal operating position, means for pivoting each of said safety rails about a vertical axis located at said front end of said truck to move each of said safety rails from a rest position perpendicular to the longitudinal axis of said truck into the operating position and means for holding each of said safety rails in said operating position.

7. A truck as set forth in claim 5, wherein each of said safety rails is operatively connected with a position-holding switch adapted to be activated to interrupt electric current supply to said electric drive motor when said platform and said safety rails are in the rest position and said truck is to be operated as walking mode.

8. A truck as set forth in claim 6, wherein each of said safety rails is operatively connected with a position-holding switch adapted to be activated to interrupt electric current supply to said electric drive motor when said platform and said safety rails are in the rest position and said truck is to be operated as a walking mode.

* * * * *

UNITED STATES PATENT AND TRADEMARK OFFICE
CERTIFICATE OF CORRECTION

PATENT NO. : 5,117,944

DATED : June 2, 1992

INVENTOR(S) : Jacques Hurtevent

It is certified that error appears in the above-identified patent and that said Letters Patent is hereby corrected as shown below:

Title page, after [54] and Column 1, line 1, title "ELECTRICAL" should read --ELECTRIC--.

Column 5 Line 36 "90." should read --90°--.

Claim 7 Line 58 Column 6 after "as" insert --a--.

Signed and Sealed this

Seventeenth Day of August, 1993

Attest:

BRUCE LEHMAN

*Attesting Officer*  *Commissioner of Patents and Trademarks*